(12) United States Patent
Tsukamoto et al.

(10) Patent No.: US 7,410,512 B2
(45) Date of Patent: *Aug. 12, 2008

(54) BIPOLAR ELECTRONICS PACKAGE

(75) Inventors: Hisashi Tsukamoto, Saugus, CA (US);
Clay Kishiyama, Burbank, CA (US);
Naoki Ota, Stevenson Ranch, CA (US)

(73) Assignee: Quallion LLC, Sylmar, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/377,262

(22) Filed: Mar. 15, 2006

(65) Prior Publication Data

US 2006/0156538 A1    Jul. 20, 2006

Related U.S. Application Data

(63) Continuation of application No. 10/222,283, filed on Aug. 15, 2002, now Pat. No. 7,041,413, which is a continuation-in-part of application No. 09/774,450, filed on Jan. 30, 2001, now Pat. No. 6,607,843, which is a continuation-in-part of application No. 09/842,790, filed on Apr. 25, 2001, now Pat. No. 6,605,382.

(60) Provisional application No. 60/199,893, filed on Apr. 26, 2000, provisional application No. 60/179,764, filed on Feb. 2, 2000.

(51) Int. Cl.
*H01M 10/38* (2006.01)
(52) U.S. Cl. ............................ 29/623.1; 29/623.2
(58) Field of Classification Search ................ None
See application file for complete search history.

(56) References Cited

U.S. PATENT DOCUMENTS

| 2,572,071 A | 10/1951 | Ellis |
| 2,582,973 A | 1/1952 | Ellis |
| 2,585,922 A | 2/1952 | Ellis |
| 2,740,822 A | 4/1956 | Sexe |
| 2,768,229 A | 10/1956 | Herbert |
| 3,791,868 A | 2/1974 | Compton et al. |
| 3,826,685 A | 7/1974 | Dubin et al. |
| 3,946,751 A | 3/1976 | Breiter et al. |
| 3,985,576 A | 10/1976 | Lingscheit et al. |

(Continued)

FOREIGN PATENT DOCUMENTS

EP    0 235 504 A1    9/1987

(Continued)

OTHER PUBLICATIONS

Article 34 Amendment as filed on Nov. 9, 2001 in relation to Application No. PCT/US01/13398.

(Continued)

*Primary Examiner*—John S Maples
(74) *Attorney, Agent, or Firm*—Gavrilovich Dodd & Lindsey LLP

(57) ABSTRACT

A sealed electronics package comprising a tubular case wall including first and second conductive portions electrically separated by an insulative partition, a hermetic seal between the insulative partition and the first conductive portion, a hermetic seal between the insulative partition and the second conductive portion, end caps, and a hermetic seal between the end caps to the tubular case wall.

13 Claims, 11 Drawing Sheets

U.S. PATENT DOCUMENTS

| | | | |
|---|---|---|---|
| 4,053,687 A | 10/1977 | Coibion et al. | |
| 4,091,190 A | 5/1978 | Heintz | |
| 4,158,721 A | 6/1979 | Decker et al. | |
| 4,167,413 A | 9/1979 | Christ et al. | |
| 4,170,694 A | 10/1979 | Chase et al. | |
| 4,180,700 A | 12/1979 | Kraska et al. | |
| 4,215,466 A | 8/1980 | Bindin | |
| 4,217,137 A | 8/1980 | Kraska et al. | |
| 4,234,668 A | 11/1980 | Park et al. | |
| 4,288,843 A | 9/1981 | Schroeder | |
| 4,294,897 A | 10/1981 | Bindin | |
| 4,375,127 A | 3/1983 | Elkins et al. | |
| 4,722,137 A | 2/1988 | Ellenberger | |
| 4,940,858 A | 7/1990 | Taylor et al. | |
| 5,053,294 A | 10/1991 | Sernka et al. | |
| 5,134,044 A | 7/1992 | Megerle | |
| 5,194,337 A | 3/1993 | Yoshida et al. | |
| 5,279,909 A | 1/1994 | Horner et al. | |
| 5,320,915 A | 6/1994 | Ali et al. | |
| RE34,819 E | 1/1995 | Mizuhara | |
| 5,411,818 A | 5/1995 | Barlow et al. | |
| 5,578,394 A | 11/1996 | Oweis et al. | |
| 5,789,068 A | 8/1998 | King et al. | |
| 6,040,086 A | 3/2000 | Yoshida et al. | |
| 6,042,625 A | 3/2000 | Daio et al. | |
| 6,071,638 A | 6/2000 | Fradin | |
| 6,087,041 A | 7/2000 | Tucholski et al. | |
| 6,114,059 A | 9/2000 | Watanabe et al. | |
| 6,139,986 A | 10/2000 | Kurokawa et al. | |
| 6,197,074 B1 | 3/2001 | Satou et al. | |
| 6,219,224 B1 | 4/2001 | Honda | |
| 6,235,424 B1 | 5/2001 | Cho | |
| 6,245,457 B1 | 6/2001 | Romero | |
| 6,245,464 B1 | 6/2001 | Spillman et al. | |
| 6,258,485 B1 | 7/2001 | Kitoh | |
| 6,280,873 B1 | 8/2001 | Tsukamoto | |
| 6,319,628 B1 | 11/2001 | Zama | |
| 6,335,117 B1 | 1/2002 | Yoshida et al. | |
| 6,379,840 B2 | 4/2002 | Kitoh et al. | |
| 6,440,604 B1 | 8/2002 | Inoue et al. | |
| 6,521,350 B2 | 2/2003 | Fey et al. | |
| 6,569,565 B2 * | 5/2003 | Ligeois et al. | 429/178 |
| 2001/0046625 A1 | 11/2001 | Ruth, II et al. | |
| 2001/0053476 A1 | 12/2001 | Ruth et al. | |
| 2002/0142216 A1 | 10/2002 | Skoumpris | |

FOREIGN PATENT DOCUMENTS

| | | |
|---|---|---|
| EP | 0 989 623 A1 | 3/2000 |
| EP | 1 246 275 A2 | 10/2002 |
| JP | 59-012557 | 1/1984 |
| JP | 01073750 A2 | 3/1989 |
| JP | 1239958 A2 | 9/1989 |
| JP | 01253941 A2 | 10/1989 |
| JP | 05-060241 | 3/1993 |
| JP | 6036795 A2 | 2/1994 |
| JP | 10-012270 | 1/1998 |
| JP | 11186423 A2 | 7/1999 |
| JP | 11-224660 A | 8/1999 |
| JP | 11-250934 A2 | 9/1999 |
| JP | 2000-058033 A2 | 2/2000 |
| JP | 2000068396 A2 | 3/2000 |
| JP | 2000100474 A2 | 4/2000 |
| JP | 2000311666 A2 | 11/2000 |
| JP | 2000323105 A2 | 11/2000 |
| JP | 2001052759 A2 | 2/2001 |
| JP | 2001297745 A | 10/2001 |
| WO | WO 01/82397 A1 | 11/2001 |
| WO | WO 02/102589 A1 | 12/2002 |
| WO | WO 02/102590 A1 | 12/2002 |

OTHER PUBLICATIONS

Written Opinion, dated May 20, 2002, as received in relation to Application No. PCT/US01/13398.

Reply to Written Opinion as filed on Jun. 18, 2002 in relation to Application No. PCT/US01/13398.

International Preliminary Examination Report, dated Aug. 5, 2002, as received in relation to Application No. PCT/US01/13398.

* cited by examiner

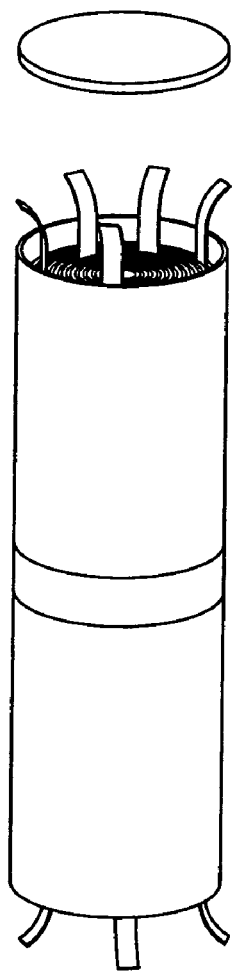
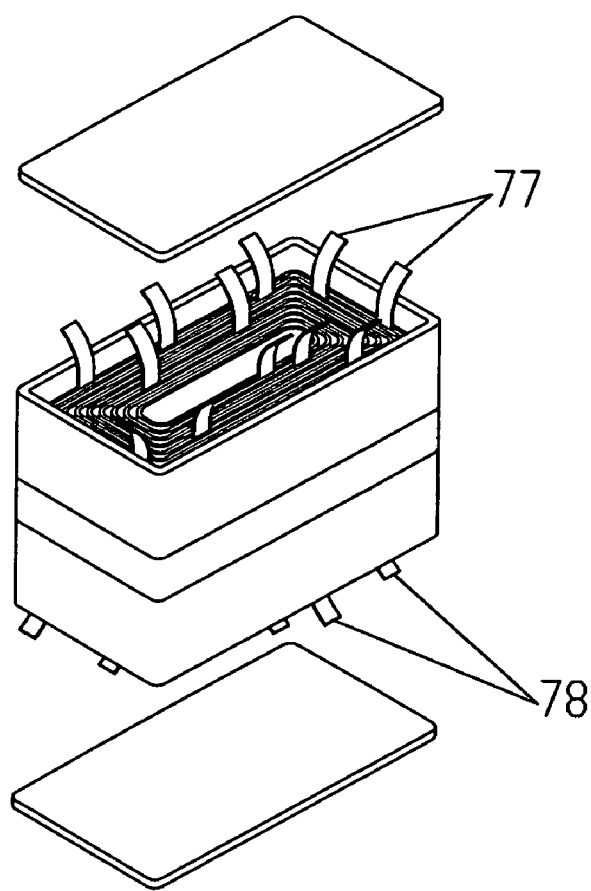
FIG. 5a
FIG. 5b

BIPOLAR ELECTRONICS PACKAGE

REFERENCE TO PRIOR FILED APPLICATIONS

This application is a Continuation of U.S. patent application Ser. No. 10/222,283, filed Aug. 15, 2002, issued as U.S. Pat. No. 7,041,413 on May 9, 2006; which is a Continuation-in-Part of U.S. patent application Ser. No. 09/774,450, filed Jan. 30, 2001, issued as U.S. Pat. No. 6,607,843 on Aug. 19, 2003, which claims priority to U.S. Provisional Application 60/179,764, filed Feb. 2, 2000; and U.S. patent application Ser. No. 10/222,283 is also a Continuation-in-Part of U.S. patent application Ser. No. 09/842,790, filed Apr. 25, 2001, issued as U.S. Pat. No. 6,605,382 on Aug. 12, 2003, which claims priority to U.S. Provisional Application 60/199,893, filed Apr. 26, 2000, each of which is incorporated herein by reference in its entirety.

FIELD OF THE INVENTION

This invention relates to an electronics package design and more particularly to a case design for devices such as batteries and capacitors that require separation of electric polarity.

BACKGROUND OF THE INVENTION

In typical electronics packaging such as a capacitor or the battery case 10 shown in FIG. 1, separation of polarity is achieved by using a sealed feedthrough 5 that includes a feedthrough pin 1, feedthrough insulator 2, and feedthrough body 3. The feedthrough body is one polarity and is insulated from the feedthrough pin, which is of opposite polarity. The feedthrough acts to carry the charge from the internal components of the battery to outside the battery. Feedthrough technology is well known, and feedthroughs can be designed in a variety of dimensions and materials. One of the design criteria for the typical feedthrough is that its length must be sufficient to form a hermetic seal within itself and to the battery case lid 6, which is hermetically sealed to the battery case body 7. This length takes up precious space in the internal volume of the sealed package or adds to the external geometry of the case. In either instance, volume is sacrificed for nonactive components of the package.

SUMMARY OF THE INVENTION

The package of the present invention minimizes this ineffective volume by incorporating the function of the feedthrough into a tubular case wall. The case is constructed by interposing an insulative partition between two conductive portions of the tubular case wall to electrically separate the two conductive portions, allowing each portion to have a different polarity. This allows the positive polarity components of the battery to be electrically connected to one portion of the tubular case wall and the negative polarity components to be connected to a separate portion of the tubular case wall, carrying the charge to the outside of the battery through the tubular case wall, thus eliminating the need for a separate feedthrough. By this invention, a single sealed chamber is created with a minimum of wasted space.

Battery assembly is simplified with this invention. First, the electrodes along with the separator are wound around a mandrel to form a "jellyroll". The electrodes have tabs extending from them that will be later attached to the case. The tabs from the positive electrode extend in opposite direction of the tabs from the negative electrode. The jellyroll is then inserted into the bipolar case with the tabs extending outside of the case. One end cap is then fit into place, sandwiching the tabs in the interface between the case and the end cap. The end cap is then laser welded to the case, simultaneously connecting the tabs to one end of the case. The battery is then filled with electrolyte from the open end of the case. After filling, the other end cap is positioned and hermetically sealed with the sandwiched tabs in the end cap—tubular case wall interface. The battery is then sent to undergo formation cycling. For the battery of the present invention, to be considered hermetic, the seals must have a leak rate of less than $10^{-8}$ atm-cc/sec He.

In a variation of the invention, the insulative partition forms substantially the entire tubular case wall, with end caps carrying the charge. The tabs are sandwiched between the end caps and metal rings, which are hermetically sealed to the insulative partition.

BRIEF DESCRIPTION OF THE FIGURES

FIGS. 4-6 are exploded views of other alternative embodiments of the bipolar electronics package of the present invention.

DETAILED DESCRIPTION

The following text describes the preferred mode presently contemplated for carrying out the invention and is not intended to describe all possible modifications and variations consistent with the spirit and purpose of the invention. The scope of the invention should be determined with reference to the claims.

Figure 1:
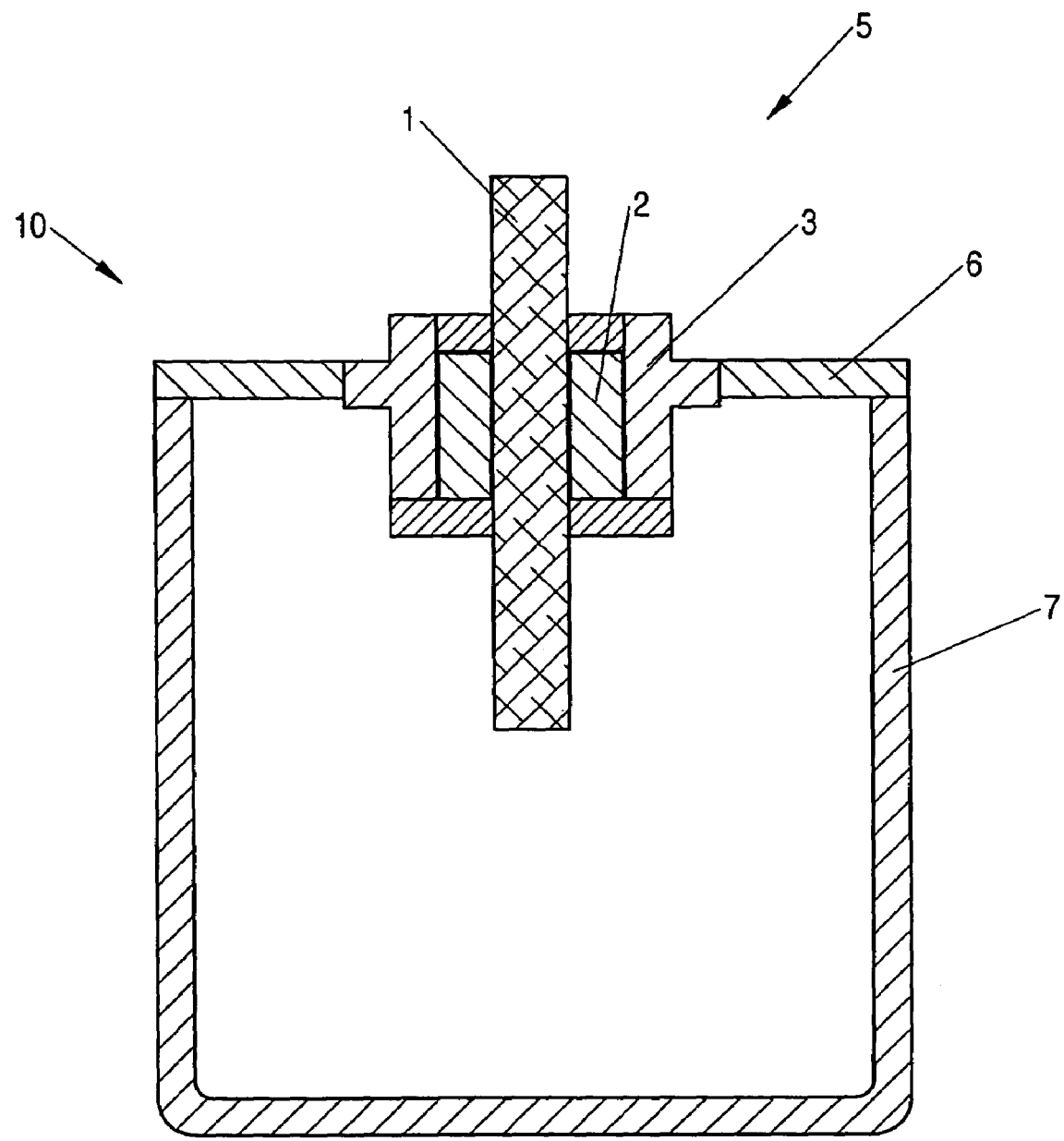
FIG. 1 is a section view of a prior art feedthrough subassembly, a battery case, and a case cover.
Figure 2A:
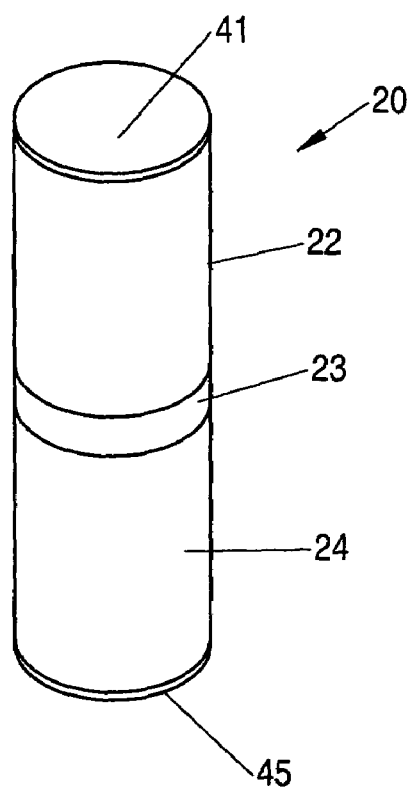
FIG. 2A is a plan view of the electronics package of the present invention.
Figure 2B:
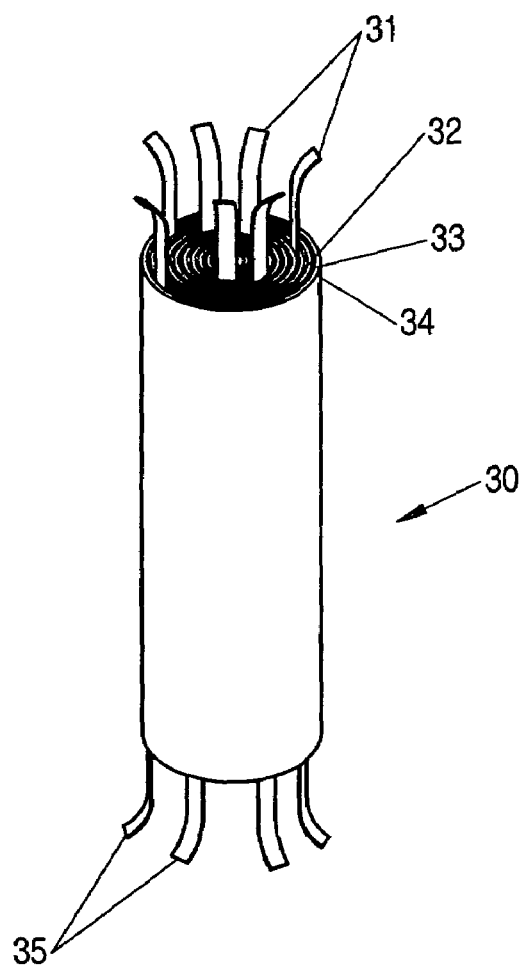
FIG. 2B is a plan view of the jellyroll formed by the electrodes and separator of the present invention.
Figure 2C:
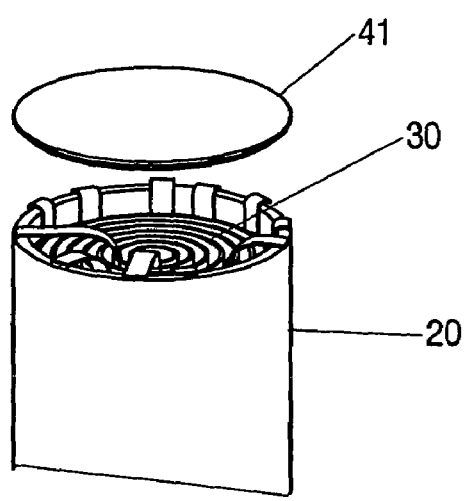
FIG. 2C is a plan view of the jellyroll inserted within the case of the present invention.

As shown in FIGS. 2A-2C, the case 20 is constructed by interposing an insulative partition 23 between two conductive case portions 22, 24 of the tubular case wall to electrically separate them, allowing them to have two different polarities. This allows the positive polarity components of the battery to be electrically connected to one portion of the tubular case wall and the negative polarity components to be connected to a separate portion of the tubular case wall. The charge is carried to the outside of the battery through the tubular case wall, thus eliminating the need for a separate feedthrough.

The insulative partition 23 preferably is ceramic such as glass, aluminum oxide, or zirconium oxide but may alternatively comprise a polymer, and preferably has the same inside and outside diameters of the conductive case portions 22, 24. However, it may be desirable for strength to provide a slightly thicker insulative partition than the conductive case portion; to maximize the internal volume, it is preferred that the insulative partition not extend into the internal volume more than 100% of the conductive case portion wall thickness beyond the conductive case portion. The conductive case portion preferably has a thickness of 0.3 to 0.8 mm, and preferably about 0.5 mm, and the insulative partition preferably has a wall thickness of about 0.3 to 1 mm. The insulative partition 23 may be mechanically attached to the separate conductive case portions by brazing, welding, or other mechanical attachment method, preferably forming a hermetic seal. The insulative partition 23 preferably has a width of at least 1 mm to ensure that conductive case portions 22 and 24 are electrically separated and not shorted during manufacturing such as by forming a bridge with brazing material.

A variety of materials can be chosen for the case; however, the materials' coefficients of thermal expansion (CTE), dimensions, and assembly methods must be considered in combination and chosen to prevent cracking. The chemistry of the electrolyte and active electrode materials is also important when choosing case materials. The electrolyte may be liquid, such as a lithium salt dissolved in a mixture of a nonaqueous liquid solvent, or may be gel or solid polymer. For lithium-ion batteries, Ti-6-4, other Ti alloys, Al, Al alloys, and 300 series stainless steels are especially suitable for the positive conductive case portions and end caps, and CP Ti, Ti alloys, Cu, Al, Al alloys, Ni, Pb, and stainless steels are especially suitable for the negative conductive case portions and end caps.

The insulative material is preferably a ceramic, and most preferably zirconium oxide, to provide strength. Alternatively, the insulative material may comprise a plastic or nonconductive carbon-loaded plastic composite. The wall strength of the case having a thin ceramic ring in the middle may be increased by bonding a supporting material across the ceramic-metal joints with a nonconductive adhesive, either on the inside or outside of the battery case, or both.

If a braze is used to attach the insulative partition to the conductive case portions, a braze material is chosen that can withstand contact with the electrolyte at high potentials without corroding; it is preferably Au-based, with a high % Au for electrochemical stability. Optionally, the braze may be protected from the electrolyte with a protective covering, which may comprise a polymer such as parylene, polyimide, polytetrafluoroethylene (PTFE), polyvinylidene fluoride (PVDF), styrene butadiene rubber (SBR), acrylic resin, epoxy resin, or urethane resin, or a metal such as gold, platinum, or aluminum, on top of the brazing material to prevent corrosion at high voltage in electrolyte. This is particularly advantageous for the positive side of the case. The protective covering may be applied by vapor deposition, plating, coating, or the like. A metallic covering of gold or the like may be advantageously deposited on the braze without sticking to the ceramic, thereby ensuring that a bridge is not inadvertently formed across the ceramic insulative partition.

In typical battery designs, some of the internal volume of the battery is reserved to make the internal attachment from the wound electrodes to the feedthrough pin. This inactive volume or "headspace" decreases the energy density of the battery. With the bipolar electronics package of the present invention, the headspace is virtually eliminated.

Furthermore, battery assembly is simplified with this inventive package. As shown in FIG. 2B, the negative electrode 34, separator 33, and positive electrode 32 are wound around a mandrel (not shown) to form a "jellyroll" 30. The positive electrode has one or more tabs 31 and the negative electrode 34 has one or more tabs 35 that will be later attached to the case 20. The tabs 31 of the positive electrode 32 extend in opposite direction to the tabs 35 of the negative electrode. The positive tabs 31 are preferably aluminum or an aluminum alloy, and the negative tabs 35 are preferably nickel or a nickel alloy or titanium or a titanium alloy.

As shown in FIG. 2C, the jellyroll 30 is inserted into the case 20 with the tabs extending outside of the case. A first end cap 41 is then fit into place, sandwiching the first set of tabs (negative or positive) in the interface between the case 20 and the first end cap 41. The first end cap is then laser welded to the case, simultaneously connecting the first set of tabs to the first end of the case.

As an alternative to extending the tabs outside of the case and then sandwiching them between the case and the end cap, the tabs may be first welded to the inside of the case 20 before installing the end cap 41.

The battery is then filled with electrolyte from the opposite, open end of the case. After filling, a second end cap 45 is positioned and hermetically sealed with the second set of tabs sandwiched in the end cap—tubular case wall interface. The battery then undergoes formation cycling.

The technique of sandwiching positive electrode tabs between a tubular case wall and end cap has been described earlier in pending U.S. application Ser. No. 09/842,790 entitled, "LITHIUM BATTERY SUITABLE FOR HYBRID ELECTRIC VEHICLES," which is assigned to the assignee of the present invention and is incorporated herein by reference.

The battery of this design is ideally used with spring contacts contacting the end caps. Alternatively, the end caps do not necessarily need to be flat, and may have features drawn in, welded on, or otherwise coupled to them for electrical connection to provide power to a device. Furthermore, the end caps may be of different physical characteristics, such as geometry for devices in which polarity matters to avoid incorrect installation. For example, one end may be square and the other round.

Figure 3A:
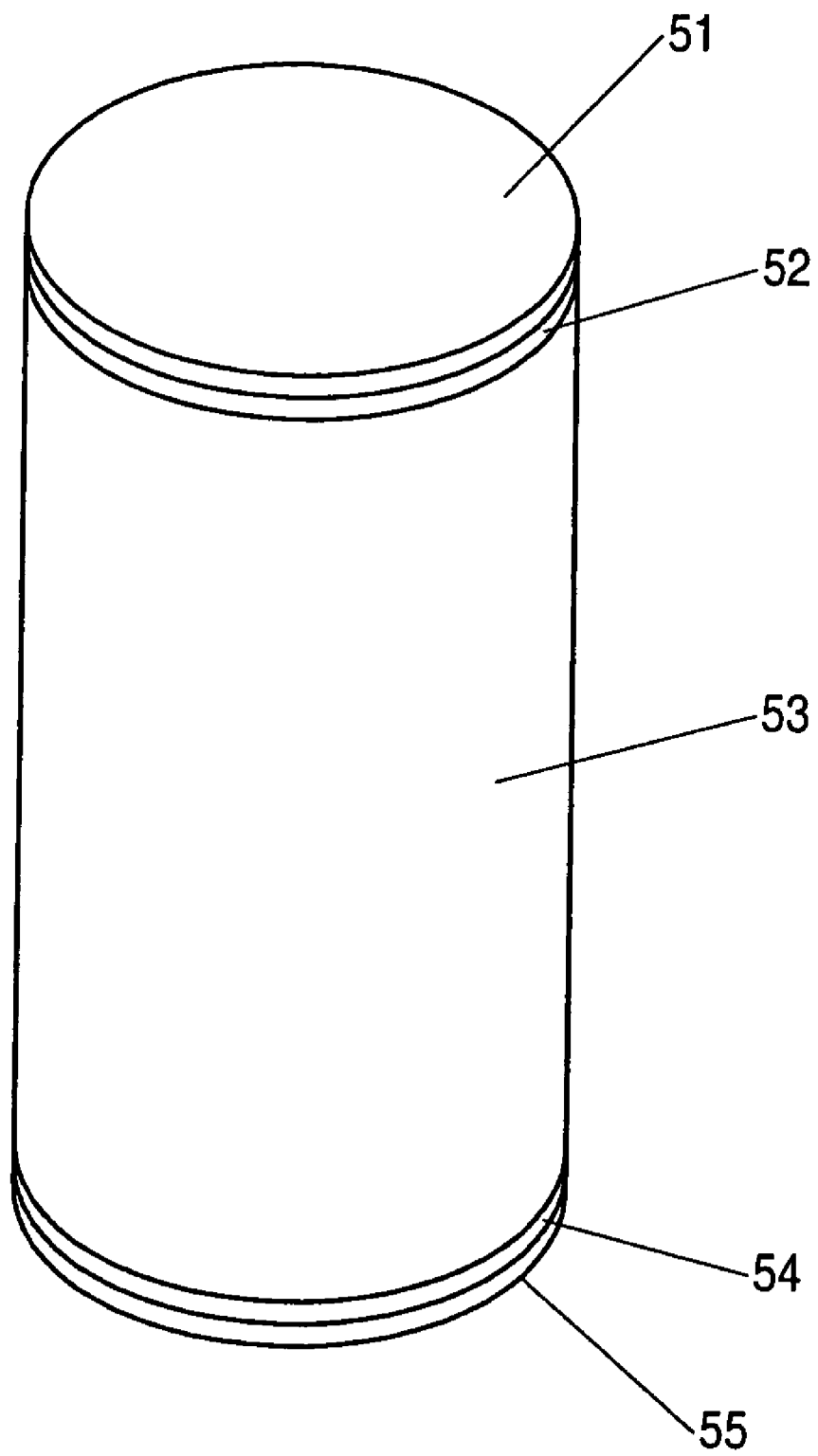
FIGS. 3A-3I are plan views of an alternative embodiment of the electronics package of the present invention.
Figure 3B:
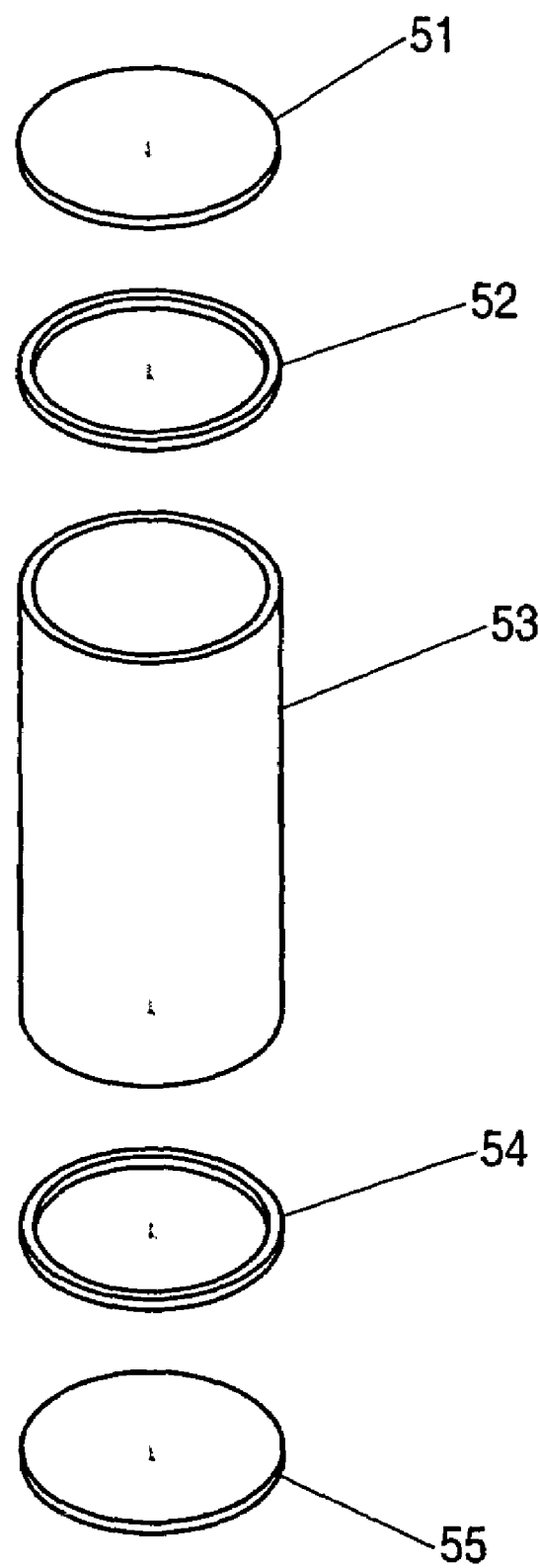
Figure 3C:
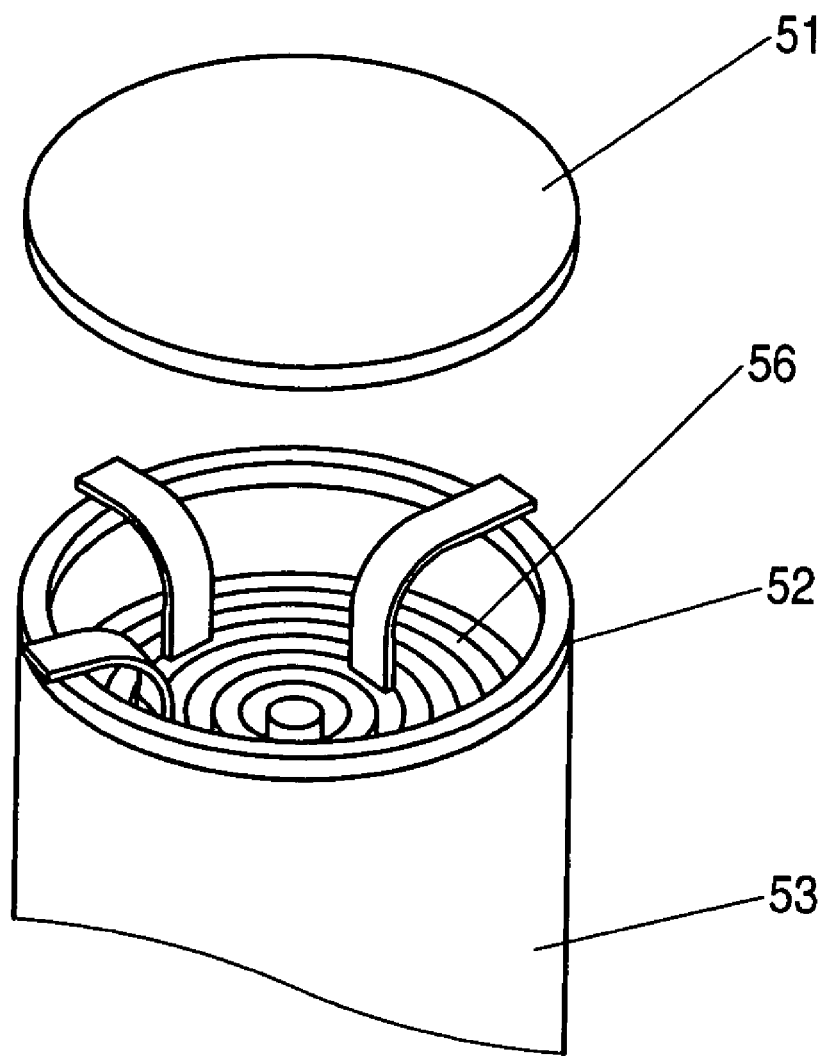
Figure 3D:
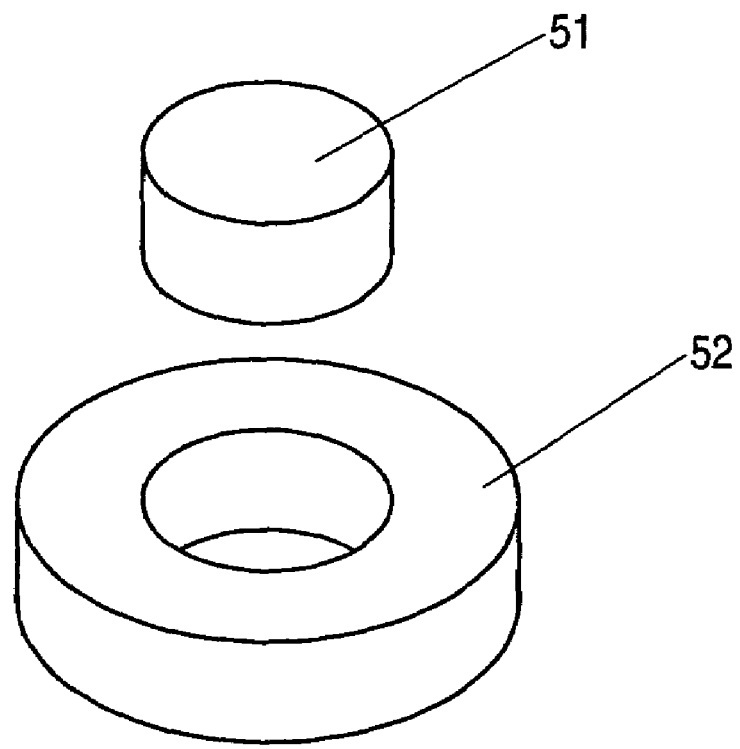
Figure 3E:
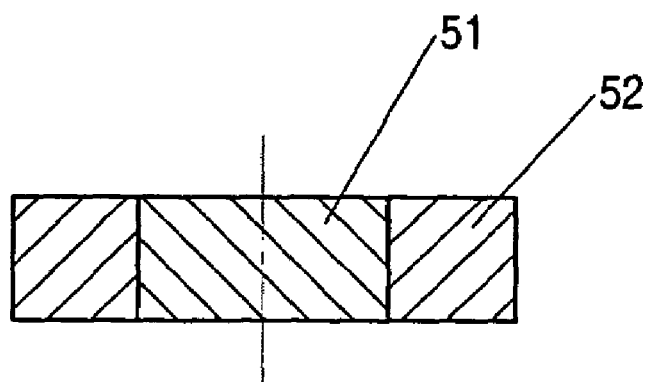
Figure 3F:
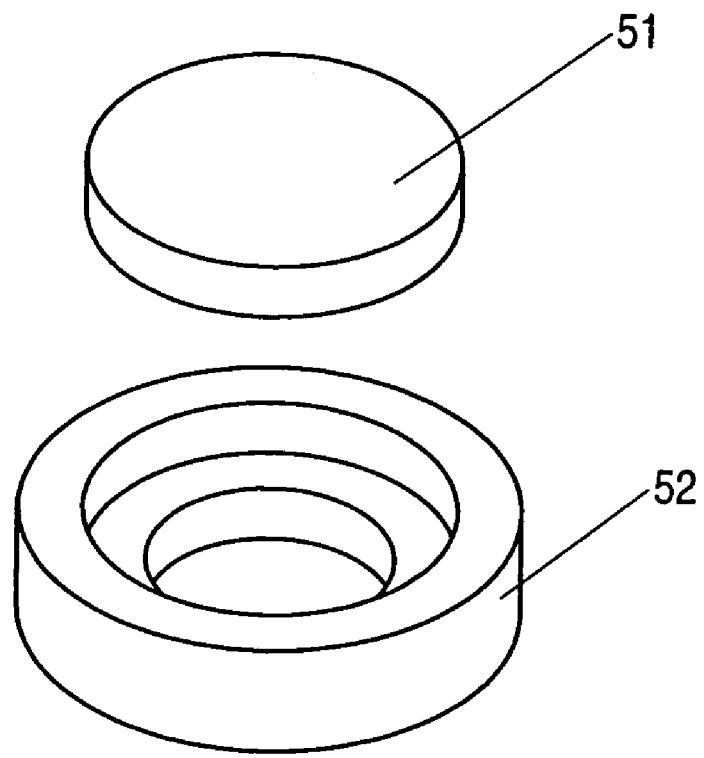
Figure 3G:
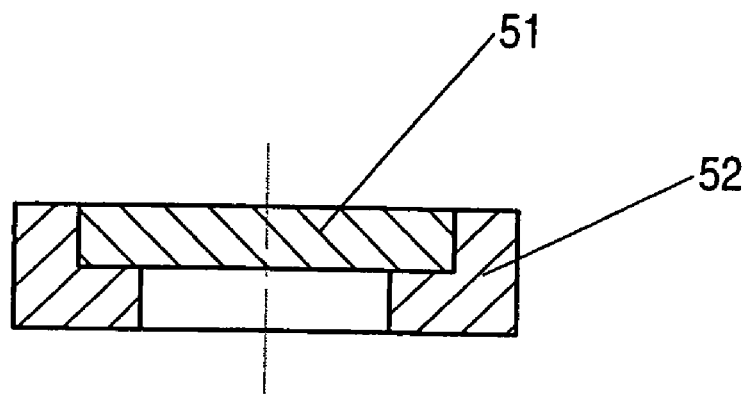
Figure 3H:
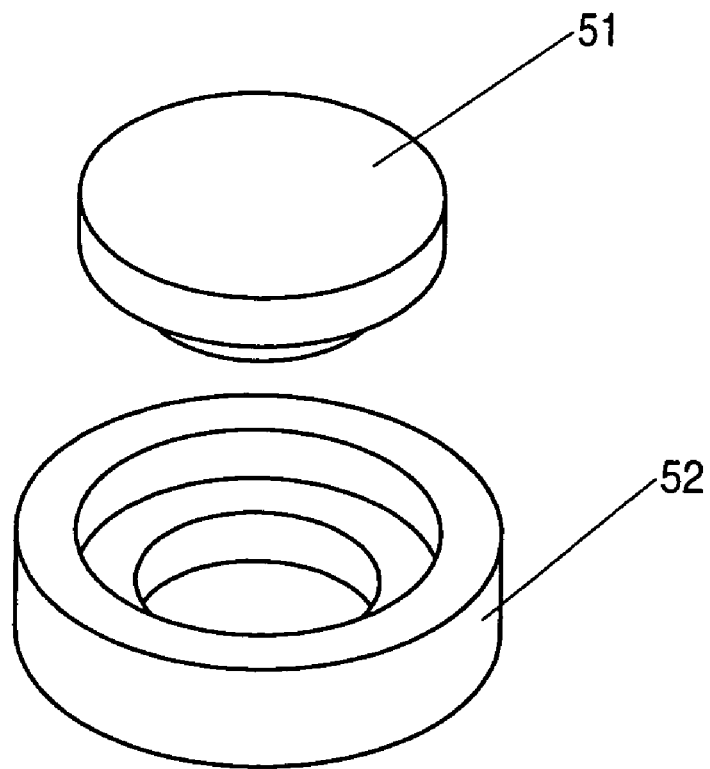
Figure 3I:
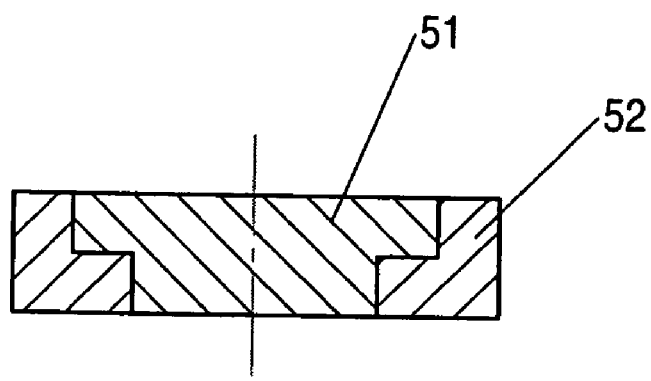

In an alternative embodiment shown in FIG. 3A-3I, the insulative partition 53 forms substantially the entire tubular case wall, with end caps 51 and 55 carrying the charge. Metal rings 52 and 54 are hermetically sealed to the ends of insulative partition 53. The tabs of the electrodes in the electrode assembly 56 are sandwiched between the metal rings 52 and 54 and the end caps 51 and 55. In FIGS. 3A-3C, metal rings 52 and 54 are illustrated as simple washers and end caps 51 and 55 are illustrated as simple disks. However, other structures may be used for the metal rings and the end caps, as shown in FIGS. 3D-3I. For these configurations where the end cap is being inserted within a hole in the metal ring, as opposed to merely being welded to a flat surface as in FIGS. 3A-3C, it is preferable that the end cap be slightly tapered for ease of insertion into the hole.

Figure 4:
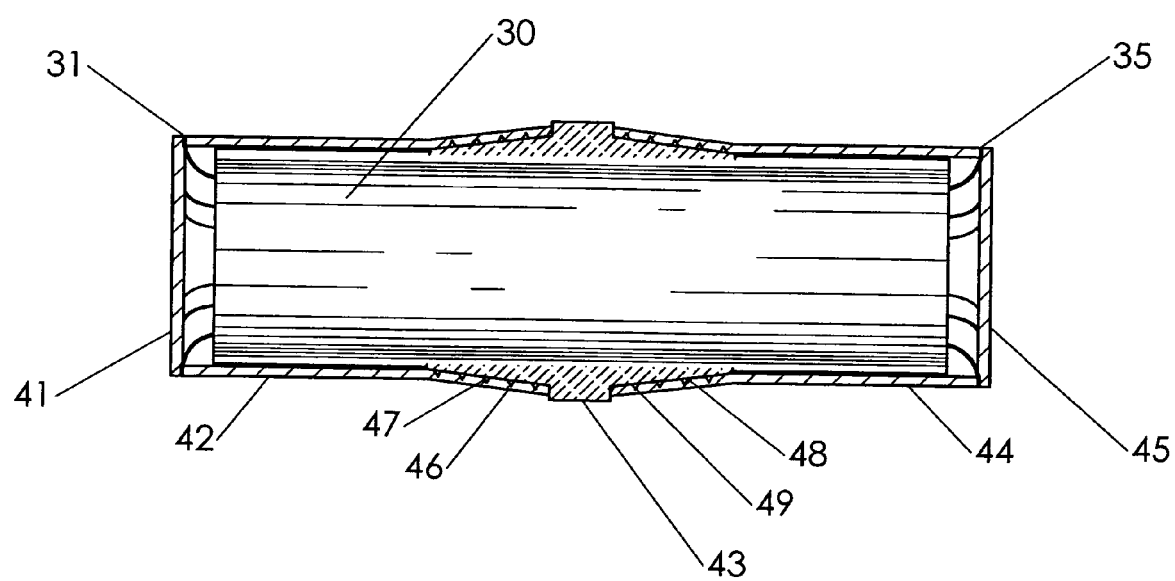

In an alternative embodiment shown in FIG. 4, insulative partition 43 may be sealed to conductive case portions 42 and 44 by mating threads 46, 47, 48, and 49. In that case, insulative partition 43 is preferably plastic. End cap 41 and conductive case portion 42 sandwich electrode tabs 31, and end cap 45 and conductive case portion 44 sandwich electrode tabs 35 of jellyroll 30.

Figure 6:
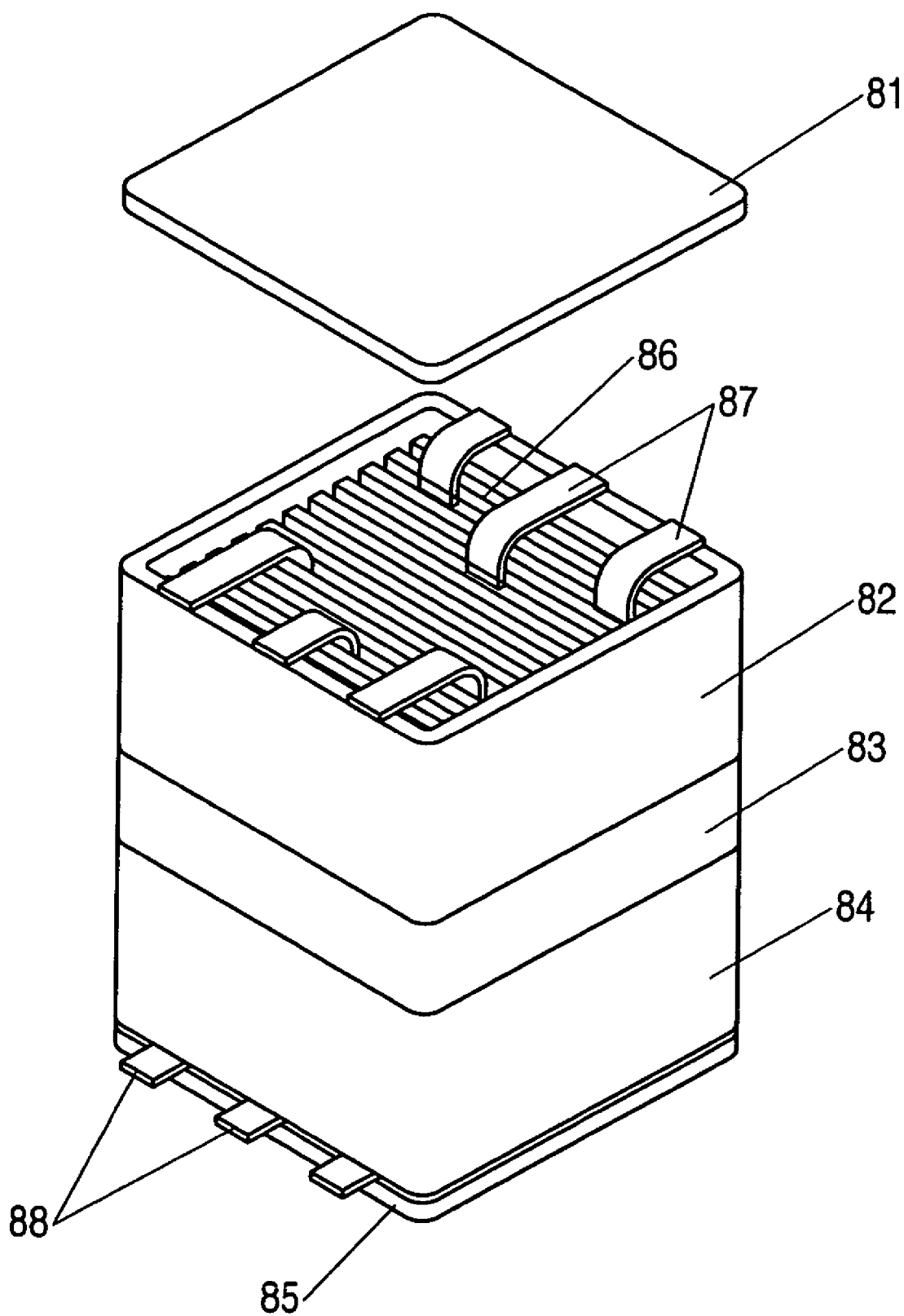

As shown in FIGS. 5A and 5B, this invention may take on a variety of forms, including those having elliptical (FIG. 5A) or rectangular (FIG. 5B) cross sections. The invention is not limited to use with a jellyroll-type electrode assembly. As shown in FIG. 6, the insulative partition 83 may be used to separate tubular case wall portions 82 and 84 in a battery having a stacked electrode configuration 86. Positive electrodes within the stack include tabs 87, which are sandwiched between tubular case wall portion 82 and end cap 81. Negative electrodes within the stack include tabs 88, which are sandwiched between tubular case wall portion 84 and end cap 85.

In noncylindrical stacked batteries in which a rigid ceramic insulative partition forms the entire tubular case wall and in which the stack is oriented such that it exerts force on the end caps, it is especially important that the end caps be flexible enough to allow for expansion and contraction during battery cycling. This may be accomplished by choice of materials, material thickness, and configuration.

The invention herein has been described by examples and a particularly desired way of practicing the invention has been described. However, the invention as claimed herein is not limited to that specific description in any manner, and numerous modifications and variations could be made thereto by those skilled in the art without departing from the scope of the invention set forth in the claims. Furthermore, the features described for one embodiment may be combined with other embodiments herein disclosed. Equivalence to the description as hereinafter claimed is considered to be within the scope of protection of this patent.

What is claimed is:

1. A method for making a sealed bipolar electronics package, comprising:
    positioning one or more negative electrodes and one or more positive electrodes in a case such that the one or more positive electrodes and the one or more negative electrodes extend through an insulative partition into a first conductive portion and also into a second conductive portion, the insulative partition being sealed to the first conductive portion and to the second conductive portion.

2. The method of claim 1, further comprising:
    coupling a first end cap to the first conductive portion.

3. The method of claim 2, wherein coupling the first end cap to the first conductive portion includes positioning one or more first tabs between the first end cap and the first conductive portion such that the one or more first tabs remain between the first end cap and the first conductive portion after coupling the first end cap to the first conductive portion, the one or more first tabs being in electrical communication with the one or more positive electrodes or with the one or more negative electrodes.

4. The method of claim 3, wherein the first end cap fits into a hole in the first conductive portion.

5. The method of claim 3, further comprising:
    positioning one or more second tabs between a second end cap and the second conductive portion, the one or more second tabs being in electrical communication with the one or more positive electrodes or with the one or more negative electrodes.

6. The method of claim 5, wherein the one or more positive electrode and the one or more negative electrodes are arranged in a jellyroll.

7. The method of claim 6, wherein the one or more first tabs extend from the jellyrole in a direction opposite to a direction from which the one or more second tabs extend from the jellyrole.

8. The method of claim 7, further comprising:
    winding the one or more positive electrodes, a separator, and one or more negative electrodes around a mandrel to form the jellyroll.

9. The method of claim 1, further comprising:
    sealing the interface between the insulative partition and the first conductive portion.

10. The method of claim 9, further comprising:
    covering a seal between the insulative partition and the first conductive portion with a protective coating selected to be inert to an electrolyte.

11. The method of claim 10, wherein the protective coating is selected from a group consisting of: parylene, polyimide, PTFE, PVDF, styrene butadiene rubber, acrylic resin, epoxy resin, and urethane resin.

12. The method of claim 10 wherein the protective coating is selected from a group consisting of: gold, platinum, and aluminum.

13. The method of claim 9, wherein sealing the interface between the insulative partition and the first conductive portion includes threading together the insulative partition and the first conductive portion.

* * * * *